United States Patent
Yang et al.

(10) Patent No.: US 9,485,604 B2
(45) Date of Patent: Nov. 1, 2016

(54) SYSTEMS AND METHODS FOR DETERMINING A CONFIGURATION FOR A WIRELESS DEVICE

(71) Applicant: Telefonaktiebolaget L M Ericsson (publ), Stockholm (SE)

(72) Inventors: Yu Yang, Solna (SE); Konstantinos Dimou, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 173 days.

(21) Appl. No.: 14/159,113

(22) Filed: Jan. 20, 2014

(65) Prior Publication Data

US 2014/0213237 A1   Jul. 31, 2014

Related U.S. Application Data

(60) Provisional application No. 61/757,178, filed on Jan. 27, 2013.

(51) Int. Cl.
| | |
|---|---|
| *H04W 4/00* | (2009.01) |
| *H04L 29/08* | (2006.01) |
| *H04W 72/04* | (2009.01) |
| *H04W 8/22* | (2009.01) |
| *H04W 52/02* | (2009.01) |

(52) U.S. Cl.
CPC .............. *H04W 4/005* (2013.01); *H04L 67/34* (2013.01); *H04W 8/22* (2013.01); *H04W 72/0406* (2013.01); *H04W 52/02* (2013.01); *Y02B 60/50* (2013.01)

(58) Field of Classification Search
CPC ... H04L 67/34; H04L 1/0001; H04L 1/1812; H04L 1/1819; H04W 4/005; H04W 72/0406; H04W 8/22; Y02B 60/50
See application file for complete search history.

(56) References Cited

U.S. PATENT DOCUMENTS

| | | | |
|---|---|---|---|
| 2013/0070629 A1* | 3/2013 | Park | H04L 1/0001 370/252 |
| 2013/0250772 A1* | 9/2013 | Yin | H04L 5/16 370/241 |
| 2014/0094127 A1 | 4/2014 | Dimou et al. | |
| 2014/0185465 A1 | 7/2014 | Balachandran et al. | |

OTHER PUBLICATIONS

Author Unknown, "3rd Generation Partnership Project; Technical Specification Group Services and System Aspects; Service requirements for Machine-Type Communications (MTC); Stage 1 (Release 12)," Technical Specification 22.368, Version 12.1.0, 3GPP Organizational Partners, Dec. 2012, 24 pages.

(Continued)

*Primary Examiner* — Nam Huynh
(74) *Attorney, Agent, or Firm* — Withrow & Terranova, PLLC

(57) ABSTRACT

Systems and methods related to reducing a cost of operation and/or manufacture of wireless devices under appropriate conditions are disclosed. In one embodiment, a wireless node in a cellular communication network determines a configuration for a wireless device. In one particular embodiment, the wireless device is a Machine-Type Communication (MTC) device. The configuration includes at least one of a retransmission configuration and an advanced receiver configuration. The wireless device is then configured according to the configuration. In this way, the operation of the wireless device can be more cost efficient, particularly in terms of radio resource and energy efficiency, based on the conditions in which the wireless device is operated.

12 Claims, 16 Drawing Sheets

(56) References Cited

OTHER PUBLICATIONS

Author Unknown, "3rd Generation Partnership Project; Technical Specification Group Radio Access Network; Evolved Universal Terrestrial Radio Access (E-UTRA); Radio Resource Control (RRC); Protocol specification (Release 10)," Technical Specification 36.331, Version 10.8.0, 3GPP Organizational Partners, Dec. 2012, 305 pages.

* cited by examiner

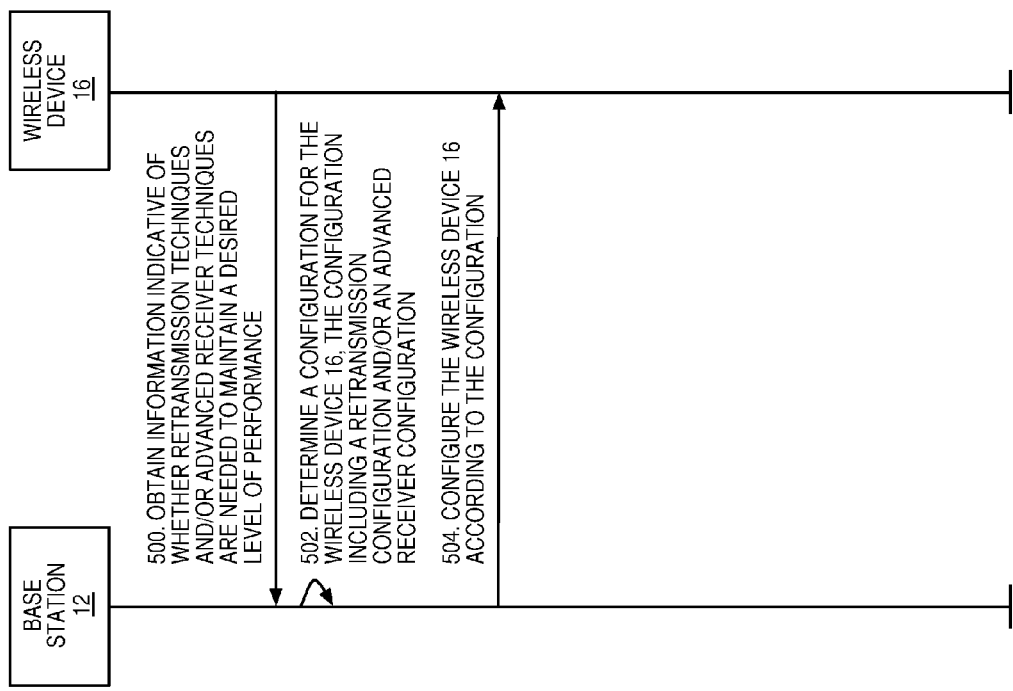

SYSTEMS AND METHODS FOR DETERMINING A CONFIGURATION FOR A WIRELESS DEVICE

RELATED APPLICATION

This application claims the benefit of provisional patent application Ser. No. 61/757,178, filed Jan. 27, 2013, the disclosure of which is hereby incorporated herein by reference in its entirety.

FIELD OF THE DISCLOSURE

The present disclosure relates to configuring a wireless device.

BACKGROUND

Machine-to-machine (M2M) communication is becoming an increasingly critical consideration in the development of future communication technologies. In M2M communications, machine-type communication (MTC) devices such as smart meters, signboards, cameras, remote sensors, laptops, and appliances are connected to a communication network. These devices may differ dramatically from conventional communication devices. Many MTC devices are designed to transmit sporadic bursts of one or a few short packets containing measurements, reports, and triggers, such as temperature, humidity, or wind speed readings. In most cases, MTC devices are expected to be installed in a fixed location or to have low mobility. MTC devices are typically low-complexity devices, targeting low-end (low average revenue per user, low data rate, high latency tolerance) applications. These devices often have severe limitations on power/energy consumption as well.

Because of these features, the M2M services defined by the $3^{rd}$ Generation Partnership Project (3GPP) Long Term Evolution (LTE) standards and other communication standards place very different requirements on a wireless network from those of traditional services, such as voice and web streaming. These differences are compounded by the fact that wireless networks supporting M2M communications may be required to serve a significantly larger number of devices than is typical in conventional wireless networks, as MTC devices are expected to be cheap and widely deployed. As a result, designing for M2M/MTC communications in wireless communication networks creates several challenges and there is an increasing need for cost-, radio resource- and energy-efficient radio access solutions for M2M applications.

In conventional wireless communication systems, for example, LTE systems, the processing of received data at the receiver (i.e., base station, relay node, or other reception point) typically includes:
  receiving the signal from a user equipment (UE) or other wireless device;
  demodulating the received signal to a baseband signal;
  applying orthogonal frequency-division multiplexing (OFDM) demodulation and cyclic prefix removal to map symbols into different physical resource blocks;
  descrambling the demodulated signal with a UE-specific sequence;
  performing rate de-matching;
  decoding the signal (e.g., at the physical layer, typically turbo coding) using a known channel de-coding scheme; and
  confirming that an error detection check (e.g., a cyclic redundancy check (CRC)) is successful.

If the CRC check succeeds, the sequence of bits (usually in the form of transport blocks) is passed from the physical layer to the media access control (MAC) layer for further processing. The receiver may also transmit feedback information (e.g., an acknowledgement (ACK) indication) confirming successful reception. If the CRC check fails, the received signal is maintained at the receiver and a retransmission may be requested. For example, the receiving node may request retransmission by sending feedback information indicating the transmission failed (e.g., a negative acknowledgement (NACK) indication) to the transmitting device.

Given the currently available solutions and the constraints associated with supporting MTC services, providing coverage to a large number of MTC devices would likely require a massive deployment of base stations (macro, micro, pico, or femto stations) or relay nodes, or the use of extremely powerful base stations with advanced receivers that possess several receiver antennas capable of collecting the weak signals from MTC devices and of using advanced radio processing to overcome the difficulties. However, both of these solutions would require great expense and significant installation effort by network operators. As a result, there is a need for efficient communication methods for M2M systems that can more effectively handle a dramatic increase in the number of MTC devices to be supported and the commensurate amount of MTC traffic.

Both the increase in M2M communications and the increasing use of MTC devices bring forth new challenges for the wireless communication networks to develop a cost-, radio resource-, and energy-efficient radio access technology for M2M applications and MTC devices. Therefore, there is a need for systems and methods that link the way wireless devices are manufactured and operated with the conditions in which the wireless devices are operated.

SUMMARY

Systems and methods related to reducing a cost of operation and/or manufacture of wireless devices under appropriate conditions are disclosed. In one embodiment, a wireless node in a cellular communication network determines a configuration for a wireless device. In one particular embodiment, the wireless device is a machine-type communication (MTC) device. The configuration includes at least one of a retransmission configuration and an advanced receiver configuration. The wireless device is then configured according to the configuration. In this way, the operation of the wireless device can be more cost-efficient, particularly in terms of radio resources and energy efficiency, based on the conditions in which the wireless device is operated.

In another embodiment, a desired capability for a wireless device having a latency requirement that is less than a standard latency requirement is determined. The desired capability comprises at least one of a reduced retransmission capability and a reduced advanced receiver capability. The reduced retransmission capability is less than a full retransmission capability defined by a corresponding standard. The reduced advanced receiver capability is less than a full advanced receiver capability defined by the corresponding standard. The wireless device is then manufactured according to the desired capability. In this way, the manufacturing of the wireless device can be more cost-efficient, particularly in terms of hardware costs. Still further, the operation of the wireless device can be more cost-efficient, particularly in terms of radio resources and energy efficiency, based on the conditions in which the wireless device is designed to be operated.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 5A-5C illustrate three embodiments of the operation of the wireless node in the cellular communication network;

DETAILED DESCRIPTION

Figure 1:
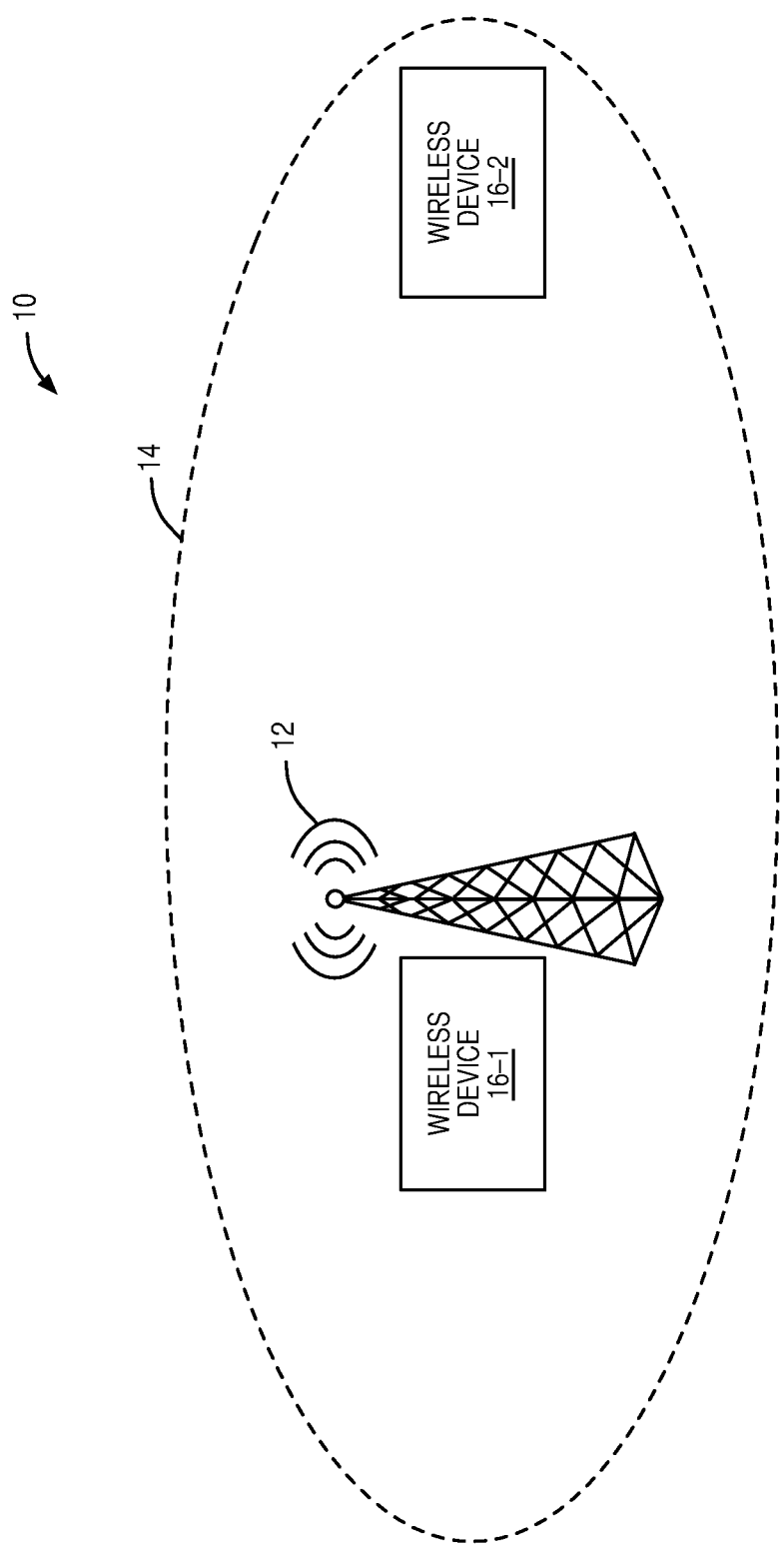
FIG. 1 illustrates a cellular communication network.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It is desirable to reduce the cost of wireless devices, or terminals, in a cellular communication network in terms of the cost of operation (e.g., cost in terms of power and/or radio resource efficiency) and/or the cost of manufacture (e.g., hardware costs, such as cost of the processor, memory, and number of antennas). As used herein, "radio resources" refers to both the time and frequency components of radio transmission. This is especially true for machine-type communication (MTC) devices performing machine-to-machine (M2M) communication, due to the large number of these MTC devices expected to be in the cellular communication network and the different requirements of M2M services on the cellular communication network as compared to services for other types of wireless devices. For example, the cost of operation of a given wireless device may be mainly associated with energy that is consumed (and hence has to be paid for) during the operation of the wireless device. As another example, a given wireless device manufactured with a slower processor in the reception chain typically has a lower manufacturing cost than the same wireless device manufactured with a faster processor. More specifically, the cost for manufacturing and operating a given device may be considered equivalent to the CAPEX and OPEX an operator has to calculate for buying/installing a new network and for operating the new network.

In this regard, systems and methods related to reducing a cost of operation and/or manufacture of wireless devices under appropriate conditions are disclosed. However, before describing embodiments of such systems and methods, a brief discussion of MTC devices, as well as a number of cellular communication network features (i.e., Hybrid Automatic Repeat Request (HARQ), advanced receiver techniques, and Transmission Time Interval (TTI) bundling) that, as discussed in some of the embodiments below, can be leveraged to reduce the cost of operation and/or manufacture of wireless devices under appropriate conditions, is provided. Note that HARQ, advanced receiver techniques, and TTI bundling are only examples and are not intended to limit the scope of the present disclosure.

In M2M communications, the MTC devices, such as smart meters, signboards, cameras, remote sensors, laptops, and appliances, are connected to the cellular communication network. Most of these MTC devices transmit sporadically one or a few short packets containing measurements, reports, or triggers. For example, some MTC devices transmit measured values such as temperature, humidity, wind speed, and others. The MTC devices are expected, in most cases, to be static or to have low mobility. A common understanding of MTC devices is that the MTC devices should be of low complexity, targeting low-end (low average revenue per user, low data rate, high latency tolerance) applications. The power/energy consumption of MTC devices is expected to be low as well.

Some cellular communication networks implement retransmission schemes such as HARQ operation. HARQ is used for error control to provide a desired reliability during high speed data transmission. In HARQ, a portion of data from an earlier transmission of a communication message may be combined with another portion of data from a later retransmission of the communication message. From the perspective of the wireless device, HARQ operation is very costly. First, downlink HARQ operation requires the storage of Protocol Data Units (PDUs). The wireless device must be capable of storing the received data in order to combine them with previous or subsequent transmissions to improve decoding of the PDU when needed. Also, for uplink HARQ operation, the wireless device must store the PDU data so that the retransmission can be performed if necessary. This requires the wireless device to have increased memory in order to implement HARQ. Secondly, HARQ feedback generation in the downlink and HARQ retransmission generation in the uplink are required. This requires the wireless device to have increased processor capacity and to use more power and radio resources in order to implement HARQ. The operation of HARQ also directly affects the manufacturing cost of the wireless device, since it affects the processor capacity and memory required by the wireless device. The operating cost of the wireless device is also affected by the operation of HARQ because of the increased energy consumption and radio resources required.

Some wireless devices have more than one antenna to use for sending and receiving signals. These wireless devices can use one or more advanced receiver techniques that allows for better reception. The wireless device can implement one or more advanced receiver techniques for combining the various signals received at each of the multiple receiver antennas into one signal with less noise and interference. Exemplary advanced receiver techniques for combining the various signals are joint reception, Maximum Ratio Combining (MRC), and Interference Rejection Combining (IRC). Each advanced receiver technique requires a specific amount of signal processing that requires additional memory capacity and processor capacity. Additionally, the various advanced receiver techniques provide a specific increase to the received signal quality.

In many cellular communication networks, data is transmitted in packets or frames. For example, in UMTS, the time unit to send one of these packets is known as the TTI. Some cellular communication networks implement a scheme called TTI bundling. TTI bundling is a technique used to decrease latency when a wireless device is a long radio distance (poor channel quality) from its serving radio access node (e.g., base station). In a TTI bundling scheme, the wireless device transmits the same data in multiple consecutive TTIs. In some embodiments, each transmission includes a different encoding of the data. The receiver, perhaps a base station or other radio access node, then uses the multiple versions of the data to attempt to decode the data. A TTI bundling scheme can increase the amount of processing needed for the wireless device because it must encode and store multiple versions of each piece of data it plans to transmit. But, when the wireless device is a long radio distance (poor channel quality) from its serving radio access node, the likelihood of incorrectly receiving packets increases. In this case, using TTI bundling can actually reduce latency by getting the data decoded correctly sooner because there are not as many waiting periods where the wireless device is waiting to determine if the data was received correctly.

Returning now to embodiments of the present disclosure, FIG. 1 illustrates a cellular communication network 10 according to one embodiment of the present disclosure. As illustrated, the cellular communication network 10 includes a base station 12 serving a cell 14. The base station 12 provides wireless radio access for one or more wireless devices 16-1 and 16-2 (generally referred to herein collectively as wireless devices 16 and individually as wireless device 16) located within the cell 14. While the base station 12 is used in this and other figures, any suitable network node could perform the tasks described in relation to the base station 12. These network nodes can include any node with suitable characteristics that is in the cellular communication network 10, such as a radio access node (i.e., a node in the radio access network of the cellular communication network 10).

As discussed below, in some embodiments, the wireless devices 16 may be configured to reduce their cost of operation. For example, the wireless device 16-1 is close to the base station 12 (and therefore has good radio signal path propagation properties). This, along with other wireless device usage characteristics of the wireless device 16-1, such as latency tolerance of a traffic type for communications to or from the wireless device 16-1 and a data rate of the wireless device 16-1, may enable the wireless device 16-1 to be configured to operate more efficiently (e.g., in terms of power and/or radio resources) than other wireless devices 16 (e.g., the wireless device 16-2). As an example, if the wireless device 16-1 is an MTC device having low mobility (e.g., a static device) and low latency requirements, the wireless device 16-1 may be configured with reduced HARQ capability (e.g., no HARQ capability), a reduced advanced receiver capability (e.g., no advanced receiver capability), and/or a reduced TTI bundling capability (e.g., no TTI bundling capability).

In other embodiments, the wireless device 16-1 may be manufactured with, e.g., reduced hardware capability as compared to other wireless devices (e.g., the wireless device 16-2) in order to reduce the cost of manufacturing of the wireless device 16-1. For example, if the wireless device 16-1 is an MTC device, the wireless device 16-1 can be manufactured with less memory and less processing capacity than the wireless device 16-2 because, e.g., the wireless device 16-1 may not need to implement HARQ operation, advanced receiver techniques, and/or TTI bundling. Note that the examples given above are merely non-limiting examples. Other examples and embodiments are described below.

Figure 2:
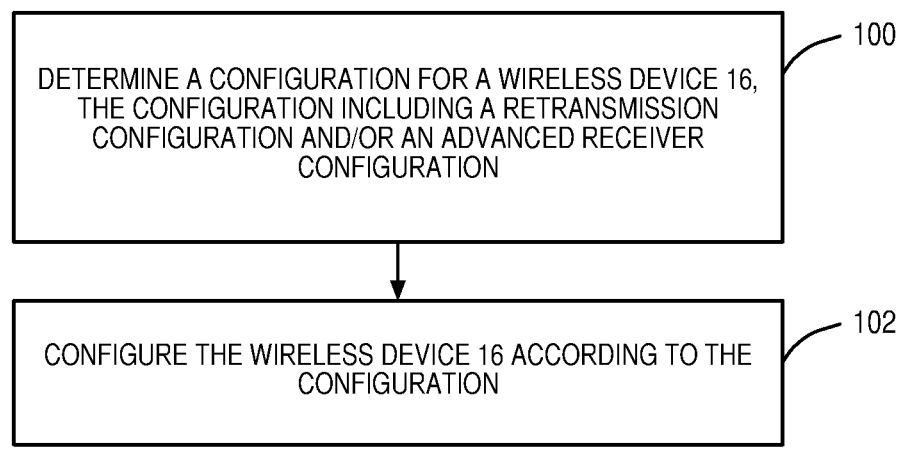
FIG. 2 illustrates the operation of a wireless node in the cellular communication network, according to one embodiment of the present disclosure.

FIG. 2 illustrates the operation of a wireless node in the cellular communication network 10 according to one embodiment of the present disclosure. The wireless node can be the wireless device 16 or a suitable network node such as the base station 12. First, the wireless node determines a configuration for the wireless device 16, where the configuration includes a retransmission configuration and/or an advanced receiver configuration (step 100). As used herein, a "retransmission configuration" is any configuration for a retransmission scheme utilized for the wireless device 16. Similarly, an "advanced receiver configuration" is any configuration of an advanced receiver technique (e.g., activate or de-activate the advanced receiver technique). As discussed below in detail, the configuration determined for the wireless device 16 depends on one or more conditions, or criteria, such as, for example, latency tolerance of a traffic type for communications to or from the wireless device 16, the data rate of the wireless device 16, a mobility of the wireless device 16, a radio distance of the wireless device 16 to the serving radio access node, and an energy profile of the wireless device 16. Based on these conditions, the configuration for the wireless device 16 is determined such that, if appropriate under the conditions, the cost of operation of the wireless device 16, e.g., in terms of power and/or radio resource efficiency, is reduced. For example, if the wireless device 16 is an MTC device having reduced latency requirements, the configuration determined for the wireless device 16 is a configuration that leverages the reduced latency requirements of the wireless device 16 to reduce the cost of operation (e.g., reduce power consumption) of the wireless device 16.

More specifically, the retransmission configuration can include configurations for retransmission schemes such as, for example, HARQ. This HARQ configuration can include a configuration for the wireless device 16 to provide or not provide a HARQ capability. For example, if the wireless device 16 is an MTC device, the retransmission configuration may include a configuration for the wireless device 16 to not provide HARQ operation. The retransmission configuration could additionally or alternatively include a configuration regarding an increased round-trip-time (RTT) for HARQ operation. For example, if the wireless device 16 is an MTC device, the retransmission configuration may include a configuration for the wireless device 16 to use an increased RTT for HARQ operation. The HARQ RTT parameter specifies the minimum amount of TTIs before a downlink HARQ retransmission is expected by the wireless device 16. By increasing the HARQ RTT, the wireless device 16 will have more time to process the data received, which in turn reduces the processor capacity needed to perform the reduced HARQ capability and the amount of energy used by the wireless device 16. Increasing the RTT increases latency and, as such, this configuration is utilized when the wireless device 16 is delay insensitive (i.e., has a low latency requirement), which is typically true for MTC devices. However, there may be conditions other than low latency under which this configuration may be used.

Furthermore, the retransmission configuration may include a configuration regarding a number of processes for HARQ operation. In particular, under the appropriate conditions, the number of HARQ processes can be reduced in order to reduce the cost of operation of the wireless device 16, particularly in terms of power consumption. For each of the processes for HARQ operation, the wireless device 16 must maintain a storage buffer to store the PDUs for the downlink and to store the PDUs for the uplink HARQ processes. In a Long Term Evolution (LTE) cellular communication network, for example, eight HARQ processes are used for both the downlink and the uplink. By decreasing the number of processes for HARQ operation of the wireless device 16, the energy used by the wireless device 16 is reduced and the wireless device 16 needs less memory capacity to store the PDU data and less processor capacity to process the separate HARQ processes. Decreasing the number of HARQ processes may increase latency and, as such, this configuration is utilized when the wireless device 16 is delay insensitive (i.e., has a low latency requirement), which is typically true for MTC devices. However, there may be conditions other than low latency under which this configuration may be used.

The advanced receiver configuration applies to wireless devices 16 with multiple receiver antennas. In particular, under the appropriate conditions, the advanced receiver capability of the wireless device 16 can be deactivated in order to reduce the cost of operation of the wireless device 16, particularly in terms of power consumption. By deactivating the advanced receiver capability of the wireless device 16, the wireless device 16 needs less memory capacity and less processor capacity to process the separate received signals, which in turn reduces the amount of energy used by the wireless device 16. Deactivating the advanced receiver capability of the wireless device 16 may increase latency and/or decrease a data rate of communication to the wireless device 16 and, as such, this configuration is utilized when the wireless device 16 is delay insensitive (i.e., has a low latency requirement) and has low data rate requirements, which is typically true for MTC devices. However, there may be conditions other than low latency under which this configuration may be used. In another embodiment, rather than deactivating the advanced receiver capability, the configuration may configure the wireless device 16 to use an advanced receiver technique that is more efficient in terms of power consumption and/or radio resource use.

Once the configuration for the wireless device 16 is determined, the wireless node then configures the wireless device 16 according to the configuration (step 102). In one embodiment, the wireless node is the wireless device 16, and the wireless device 16 configures itself according to the configuration determined in step 100. In another embodiment, the wireless node is a node other than the wireless device 16 (e.g., the base station 12), in which case, the wireless node operates to configure the wireless device 16 (e.g., via signaling the configuration to the wireless device 16).

Figure 3:
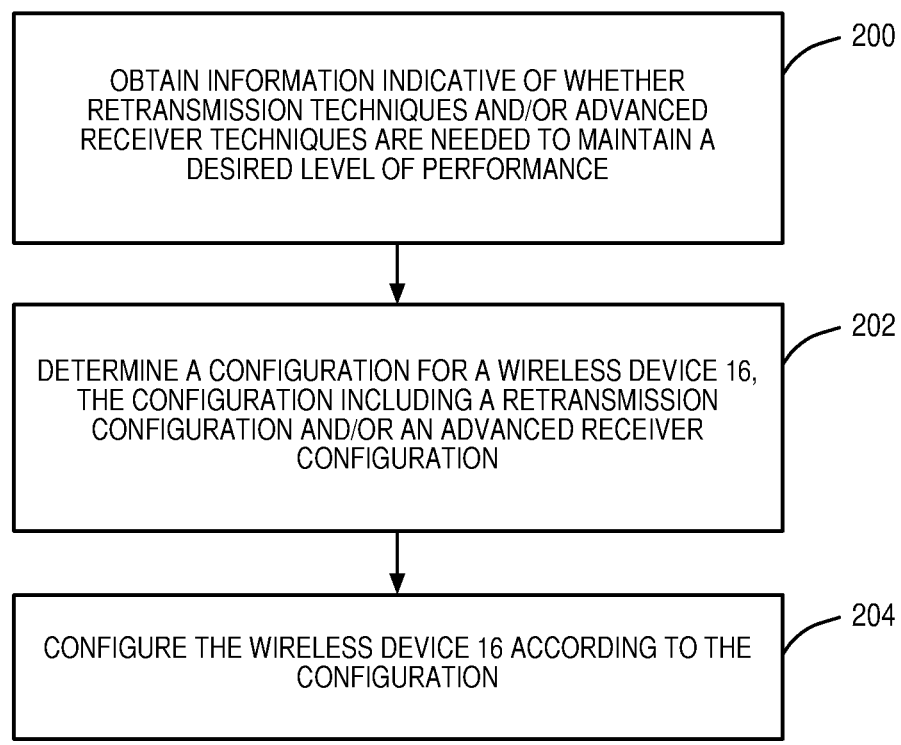
FIG. 3 illustrates the operation of the wireless node in the cellular communication network, according to another embodiment of the present disclosure.

FIG. 3 illustrates the operation of the wireless node in the cellular communication network 10, according to one embodiment of the present disclosure. The wireless node obtains information indicative of whether retransmission techniques and/or advanced receiver techniques are needed to maintain a desired level of performance (step 200). Based on the information, the wireless node determines a configuration for a wireless device 16, where the configuration includes a retransmission configuration and/or an advanced receiver configuration for the wireless device 16 (step 202). The wireless node then configures the wireless device 16 according to the configuration (step 204).

The wireless node can obtain the information indicative of whether retransmission techniques and/or advanced receiver techniques are needed to maintain a desired level of performance with respect to the wireless device 16 using any suitable technique. Further, the particular information obtained can be any type of information that is indicative of whether retransmission techniques and/or advanced receiver techniques are need to maintain the desired level of performance with respect to the wireless device 16. Some examples of the information include wireless device usage characteristics, such as latency tolerance of a traffic type for communications to or from the wireless device 16, the data rate of the wireless device 16, a mobility of the wireless device 16, a radio distance of the wireless device 16 to the serving radio access node, and an energy profile of the wireless device 16. Also, examples of the information may include wireless device characteristics, such as an amount of memory of the wireless device 16, a processor capacity of the wireless device 16, a number of antennas of the wireless device 16, a capability of the wireless device 16 to perform one or more advanced receiver techniques, and a maximum transmit power of the wireless device 16, as non-limiting examples.

In this context, a low latency tolerance (i.e., a high latency requirement) means that the delay between sending and receiving should be minimal. For example, video streaming may have a lower latency tolerance, since the viewing experience would be adversely affected by the transmission delay. On the other hand, transmission of periodic sensor readings such as those from a thermometer may have a higher latency tolerance if it is unnecessary for the transmission to arrive without delay. The various wireless devices 16 can include very different operating characteristics that describe how the wireless device 16 is operated.

The mobility of a wireless device 16 refers to whether or not the wireless device 16 changes locations, and if so, how rapidly. For instance, a typical mobile phone is intended to be taken from place to place, sometimes with great speed, such as when travelling in an automobile. This wireless device 16 would have a high mobility. On the other hand, a wireless device 16 that is mounted to a fixed location and is not intended to be mobile would have a low mobility. This could be true of wireless devices 16 that are in a fixed location and transmit readings on a sensor such as a thermometer or a camera.

The radio distance of a wireless device 16 to a serving radio access node is calculated in terms of channel quality. This can be determined, for example, by the Reference Signal Received Power (RSRP) or the Channel-Quality Indicator (CQI) reported by the wireless device 16, or by the Signal-to-Interference-and-Noise Ratio (SINR) measured at the network node. For illustrative purposes, the wireless device 16-1 in FIG. 1 has a much smaller radio distance to the base station 12 than the wireless device 16-2, which is very near to the edge of the serving cell 14.

The energy profile of a wireless device 16 encompasses values such as the availability of abundant energy. In some uses, a wireless device 16 may be wired into the electrical grid and the availability of abundant energy may not be a concern. In other uses, a wireless device 16 may have only a limited energy source available to it, such as a solar panel or a battery. In some cases, energy may be available, but the cost of that energy may require that the amount used is a concern.

Figure 4:
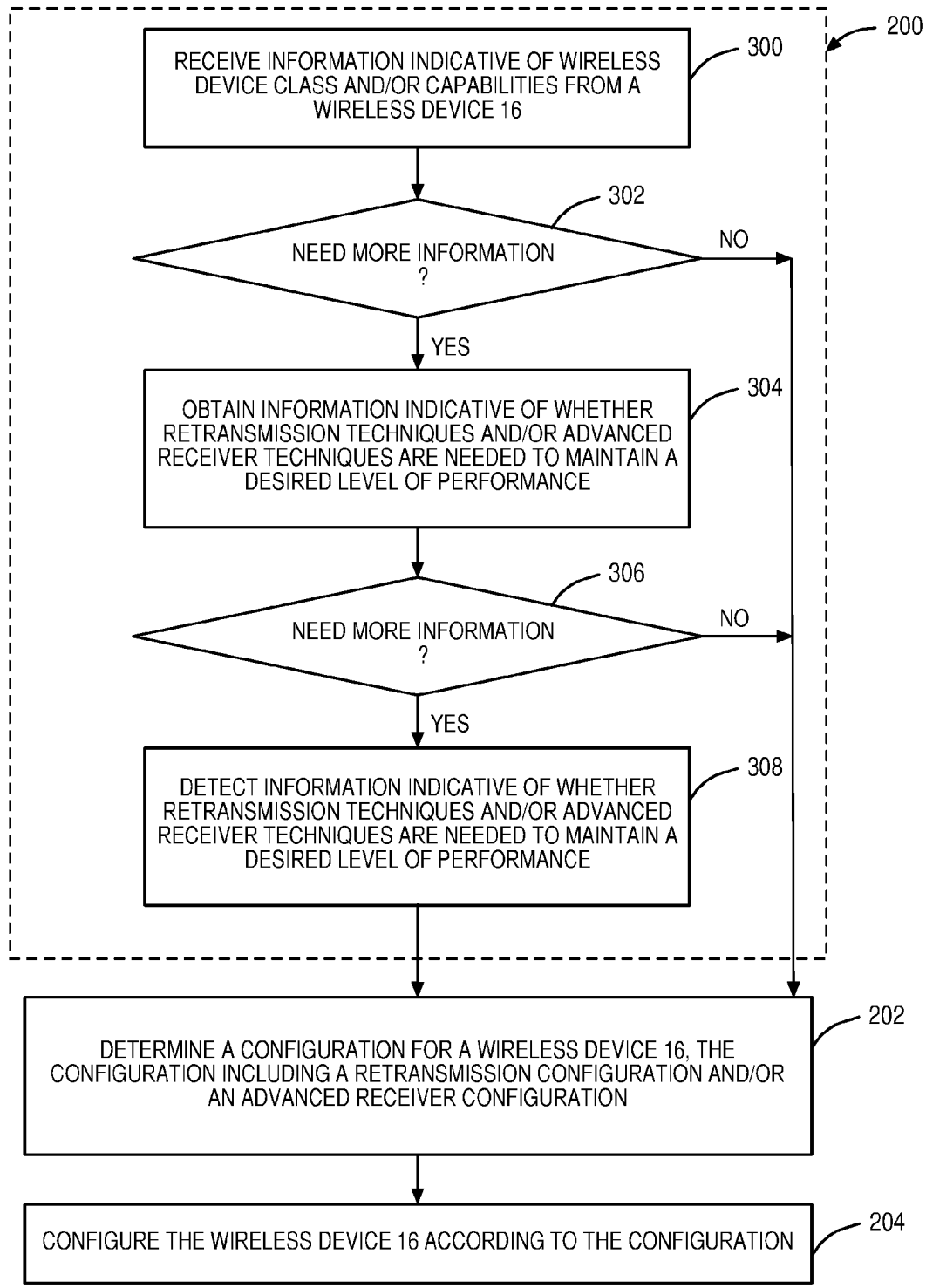
FIG. 4 illustrates a more detailed operation of the wireless node in the cellular communication network as in FIG. 3, according to one embodiment of the present disclosure.

FIG. 4 is a more detailed illustration of the process of FIG. 3 according to one embodiment of the present disclosure. First, as described above with respect to FIG. 3, the wireless node obtains information indicative of whether retransmission techniques and/or advanced receiver techniques are needed to maintain a desired level of performance (step 200). More specifically, in order to obtain the information that is indicative of whether retransmission techniques and/or advanced receiver techniques are needed to maintain the desired level of performance, the wireless node performs steps 300-308. While steps 300-308 are shown as being performed in a specific order, this is merely a non-limiting example. The wireless node may implement steps 300-308 in any desired order and, in some embodiments, some or all of these steps may be carried out in parallel.

In this regard, FIG. 4 illustrates that as part of step 200, the wireless node receives information indicative of a wireless device class and/or capabilities from the wireless device 16 (step 300). For instance, two or more wireless device classes may be defined for the cellular communication network 10, where wireless devices 16 in each wireless device class are known to have certain characteristics (e.g., wireless device usage characteristics and/or wireless device characteristics). The wireless node may obtain information indicative of the wireless device class of the wireless device 16 from the wireless device 16 or from another network node. In addition or alternatively, the wireless node may obtain information that is indicative of the capabilities or characteristics of the wireless device 16, such as, e.g., one or more information elements containing one or more capabilities of the wireless device 16.

The wireless node then determines whether more information is needed to make a determination as to whether retransmission techniques and/or advanced receiver techniques are needed to maintain a desired level of performance for the wireless device (step 302). If no additional information is needed, the wireless node continues on to step 202. If, on the other hand, the wireless node determines that more information is needed to make a determination, the wireless node obtains information indicative of whether retransmission techniques and/or advanced receiver techniques are needed to maintain the desired level of performance from the wireless device 16 (step 304). This step can be accomplished, for example, by sending a request to the wireless device 16 requesting the specified information and then receiving a reply from the wireless device 16 containing all or part of the information requested.

Again, the wireless node determines whether more information is needed to make the determination (step 306). If no additional information is needed, the wireless node continues on to step 202. If, on the other hand, the wireless node determines that more information is needed to make the determination, the wireless node detects information indicative of whether retransmission techniques and/or advanced receiver techniques are needed to maintain a desired level of performance from the wireless device 16 (step 308). For instance, if the wireless node is a network node such as the base station 12 of FIG. 1, the base station 12 may detect the traffic arrival pattern for transmissions from the wireless device 16 and use this to determine a latency tolerance and a data rate for the wireless device 16. Also, the base station 12 could determine the radio distance of the wireless device 16 using the SINR or another measure of channel quality. Further, the base station 12 could determine the mobility of the wireless device 16 by estimating a Doppler frequency offset of the wireless device 16. The wireless node then determines the configuration for the wireless device 16 and then configures the wireless device, as discussed above (steps 202 and 204).

Figure 5A:
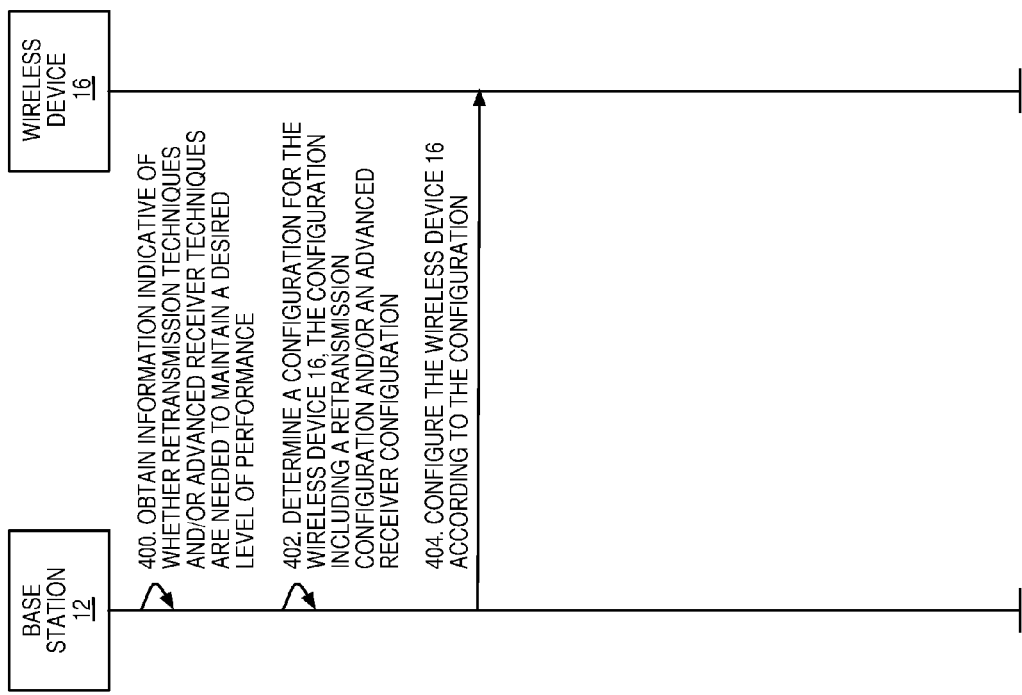
Figure 5C:
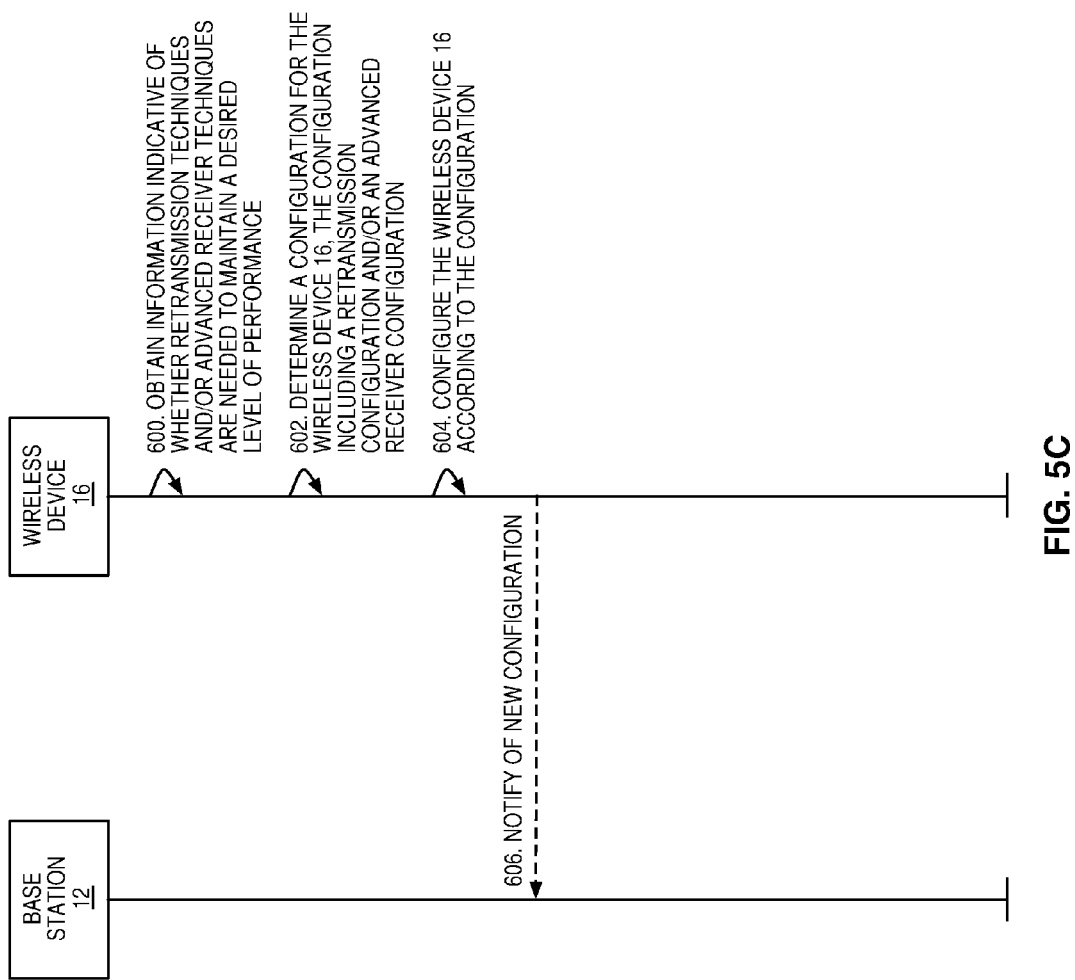

FIGS. 5A-5C illustrate three embodiments of the operation of the cellular communication network 10 to configure one of the wireless devices 16 according to the process of FIG. 3 or 4. In these embodiments, the steps of FIG. 3 or 4 are performed by the base station 12 (FIGS. 5A and 5B) or by the wireless device 16 (FIG. 5C). Note that these embodiments are only examples. The steps of FIGS. 3 and 4 may be performed by any suitable node or any suitable combination of nodes.

In the embodiment of FIG. 5A, the base station 12 obtains information indicative of whether retransmission techniques and/or advanced receiver techniques are needed to maintain a desired level of performance for the wireless device 16 (step 400). The base station 12 then determines a configuration for the wireless device 16 based on the information obtained in step 400, where the configuration includes a retransmission configuration and/or an advanced receiver configuration (step 402). The base station 12 then configures the wireless device 16 according to the configuration (step 404). Step 404 may be accomplished, according to some embodiments, by the base station 12 sending a Radio Resource Control (RRC) Connection Reconfiguration message as available in LTE. This message could include new information elements such as "HarqConfig" and/or "RxAntConfig" for configuring the retransmission capability and/or advanced receiver capability, according to one embodiment.

In the embodiment of FIG. 5B, the wireless device 16 sends information to the base station 12, where the information is indicative of whether retransmission techniques and/or advanced receiver techniques are needed to maintain a desired level of performance for the wireless device 16 (step 500). The base station 12 then determines a configuration for the wireless device 16, where the configuration includes a retransmission configuration and/or an advanced receiver configuration (step 502). The base station 12 then configures the wireless device 16 according to the configuration (step 504).

In the embodiment of FIG. 5C, the wireless device 16 obtains information indicative of whether retransmission techniques and/or advanced receiver techniques are needed to maintain a desired level of performance for the wireless device (step 600). The wireless device 16 can access this information from, e.g., local storage, and/or determine this information, according to some embodiments. The wireless device 16 then determines a configuration for itself using the information obtained, where the configuration includes a retransmission configuration and/or an advanced receiver configuration (step 602). The wireless device then configures itself according to the configuration (step 604). In some embodiments, the updated configuration of the wireless device 16 does not need to be communicated to the base station 12 or any other network node. In other embodiments, the wireless device 16 notifies the base station 12 (or some other network node) of some or all of the configurations configured for the wireless device 16 in step 604 (step 606).

Figure 6:
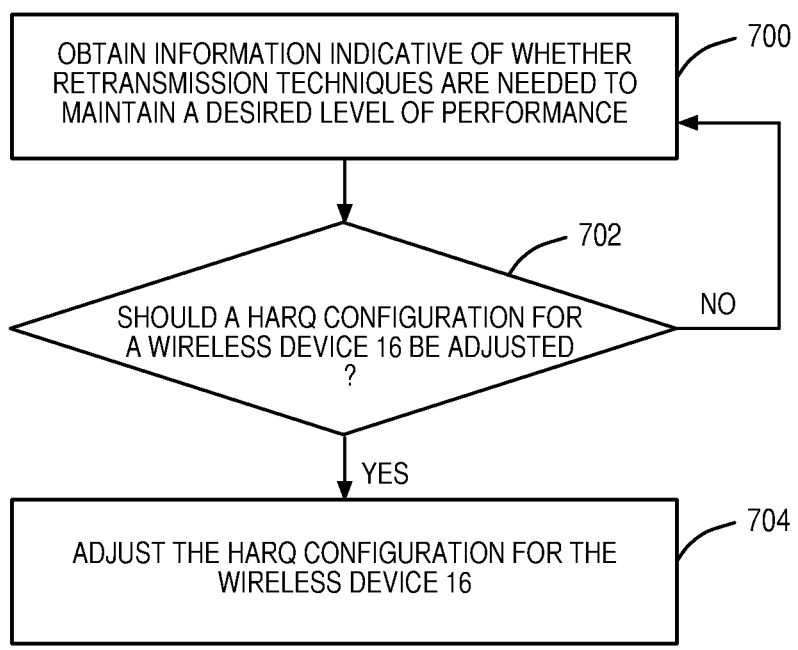
FIG. 6 illustrates a more detailed operation of the wireless node in the cellular communication network as in FIG. 3 for determining if a Hybrid Automatic Repeat Request (HARQ) configuration should be adjusted, according to one embodiment of the present disclosure.

FIG. 6 illustrates the operation of a wireless node in the cellular communication network 10 according to another embodiment of the present disclosure. This embodiment is similar to that of FIG. 3, but where the configuration for the wireless device 16 is a HARQ configuration. First, the wireless node obtains information indicative of whether retransmission techniques are needed to maintain a desired level of performance for a wireless device 16 (step 700). This step can be accomplished using, e.g., any of the embodiments described above with respect to FIGS. 3 and 4. The wireless node then determines if a HARQ configuration for a wireless device should be adjusted (step 702). According to some embodiments, the determination can be either to increase the amount of HARQ capability or to decrease the amount of HARQ capability. As an example, if the wireless node determines that the HARQ capability is not needed to maintain a desired level of performance, the wireless node may decide to disable or otherwise decrease the HARQ capability for the wireless device 16. On the other hand, if the current information indicates that a HARQ capability is needed to maintain a desired level of performance, the wireless node may decide not to adjust the HARQ configuration of the wireless device 16 or to increase the HARQ capability of the wireless device 16 in some way. If the wireless node determines to adjust the HARQ configuration for the wireless device 16, the wireless node adjusts the HARQ configuration for the wireless device (block 704).

Figure 7:
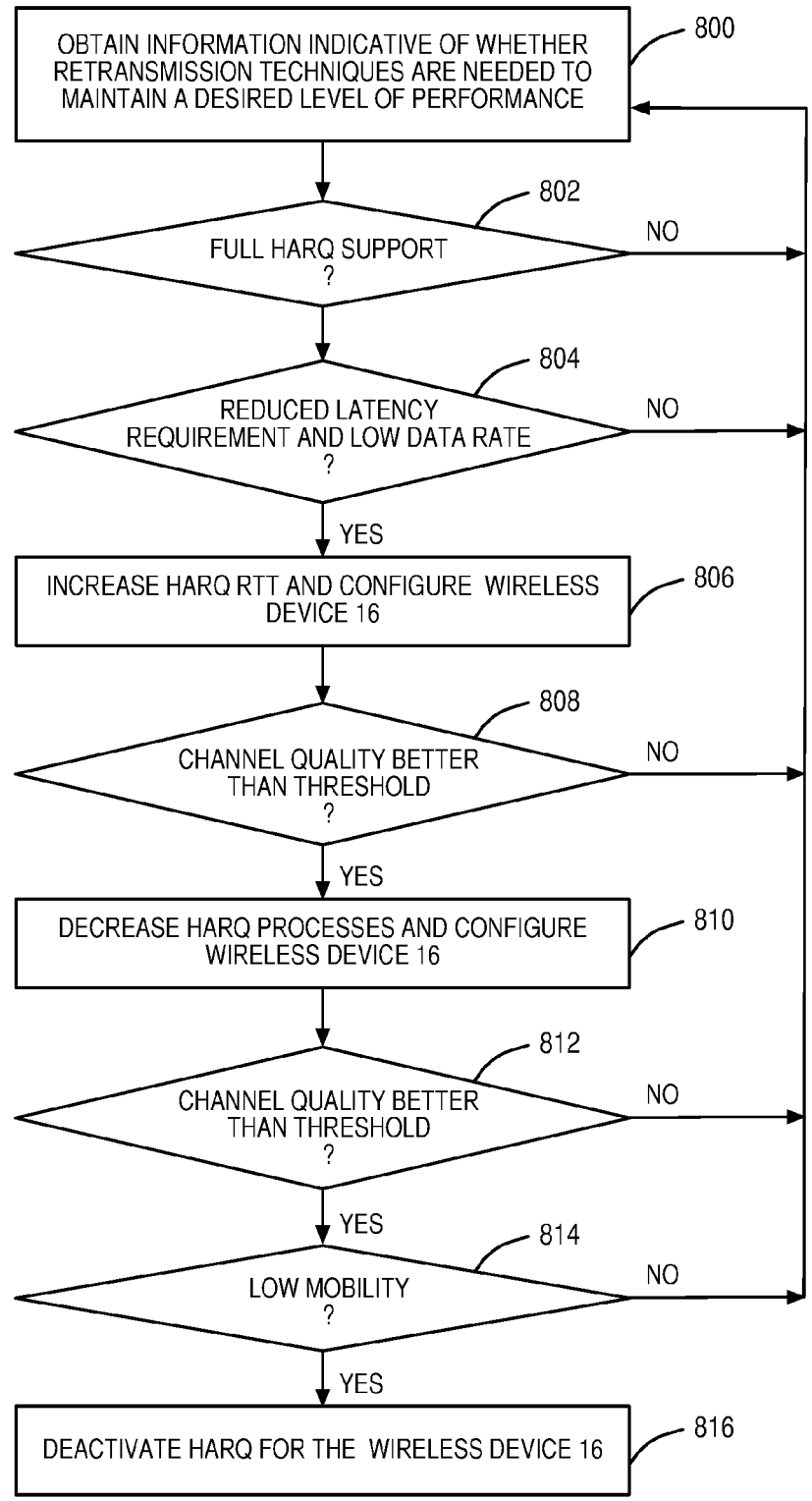
FIG. 7 illustrates a more detailed operation of the wireless node in the cellular communication network as in FIG. 6 for determining if the HARQ configuration should be adjusted, according to one embodiment of the present disclosure.

FIG. 7 illustrates a more detailed operation of the wireless node in the cellular communication network 10 as in FIG. 6 for determining if the HARQ configuration should be adjusted, according to one embodiment of the present disclosure. First, the wireless node obtains information indicative of whether retransmission techniques are needed to maintain a desired level of performance for the wireless device 16 (step 800). This step can be accomplished using, e.g., any of the embodiments described above with respect to FIGS. 3 and 4. The wireless node then determines if the wireless device 16 has full HARQ support (step 802). If the wireless device 16 does not have full HARQ support, the process returns to step 800 or, in some embodiments, goes to an alternate process.

If the wireless device 16 has full HARQ support, the wireless node determines whether the wireless device 16 has a reduced latency requirement and a low data rate (step 804). More specifically, in one embodiment, the wireless node determines whether traffic type(s) communicated to or from the wireless device 16 have reduced latency requirements or a low data rate. If not, the process returns to step 800 or, in some embodiments, goes to an alternate process. Otherwise, if the wireless device 16 has reduced latency requirements and a low data rate, the wireless node increases the HARQ RTT for the wireless device 16 and configures the wireless device 16 accordingly (step 806). According to some embodiments, this reduces the processing load of the wireless device 16 and therefore reduces the energy used by the wireless device 16.

The wireless node then checks to determine if a channel quality for communications to or from the wireless device 16 is better than a predetermined threshold (step 808). If the channel quality is not better than the predetermined threshold, the process goes back to step 800 or, in some embodiments, goes to an alternate process. If the channel quality is better than the predetermined threshold, additional energy savings may still be achieved. Therefore, the wireless node decreases the number of HARQ processes for the wireless device 16 and configures the wireless device 16 accordingly (step 810). As before, the wireless node then checks to determine if the channel quality for communications to or from the wireless device 16 is better than a predetermined threshold (step 812). If the channel quality is not better than the predetermined threshold, the process goes back to step 800 or, in some embodiments, goes to an alternate process. If the channel quality is better than the predetermined threshold, additional energy savings may still be achieved. Therefore, the wireless node determines if the wireless device 16 has low mobility (step 814). As discussed previously, this determination of the mobility of the wireless device 16 can be made based on information received from the wireless device 16 or detected by the base station 12 or other network node based on Doppler frequency offset of the wireless device 16. If the wireless device 16 does not have low mobility, the process goes back to step 800 or, in some embodiments, goes to an alternate process. If the wireless device 16 does have low mobility, more energy savings may be possible. Therefore, the wireless node deactivates the HARQ capability for the wireless device 16 and configures the wireless device 16 accordingly (step 816).

Figure 8:
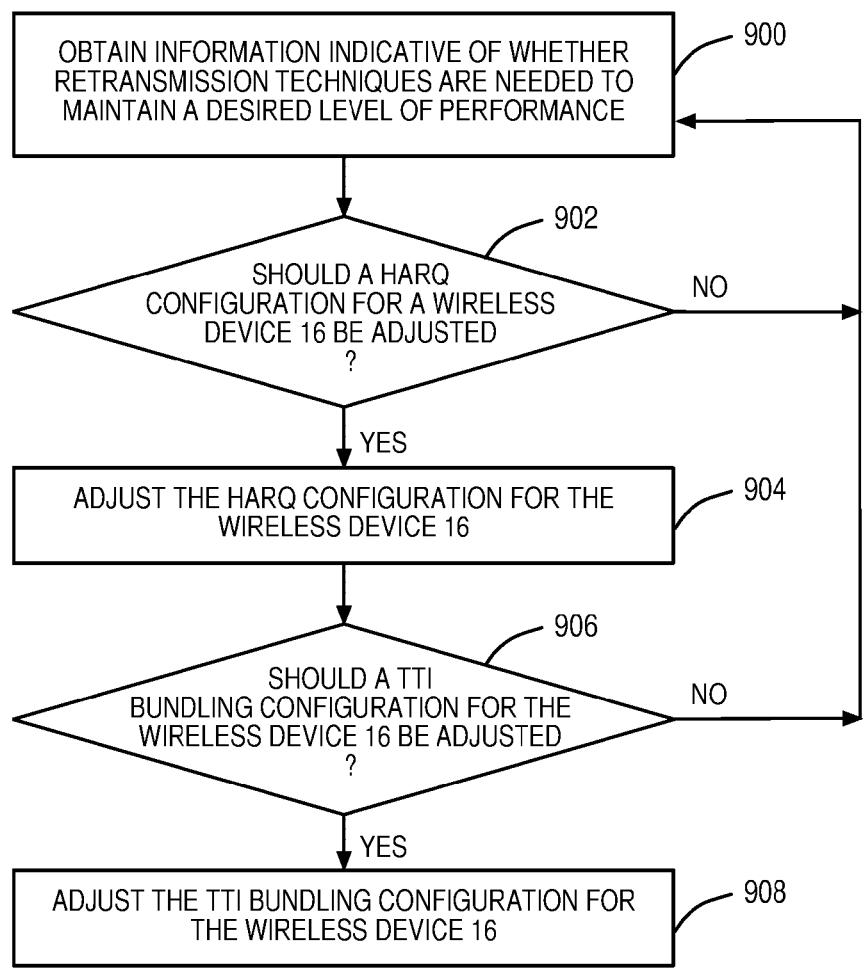
FIG. 8 illustrates the operation of the wireless node in the cellular communication network as in FIG. 6 for determining if the HARQ configuration should be adjusted and also determining if a Transmission Time Interval (TTI) bundling configuration should be adjusted, according to one embodiment of the present disclosure.

FIG. 8 illustrates the operation of the wireless node in the cellular communication network 10 as in FIG. 6 for determining if the HARQ configuration should be adjusted and also determining if a TTI bundling configuration should be adjusted, according to one embodiment of the present disclosure. First, the wireless node obtains information indicative of whether retransmission techniques are needed to maintain a desired level of performance for a wireless device 16 (step 900). This step can be accomplished using, e.g., any of the embodiments described above with respect to FIGS. 3 and 4. The wireless node then determines if a HARQ configuration for the wireless device 16 should be adjusted (step 902). According to some embodiments, the determination can be either to increase the amount of HARQ capability or to decrease the amount of HARQ capability. As an example, if the wireless node determines that the HARQ capability is not needed to maintain a desired level of performance, the wireless node may decide to disable the HARQ capability for the wireless device 16. On the other hand, if the current information indicates that a HARQ capability is needed to maintain a desired level of performance, the wireless node may decide not to adjust the HARQ configuration of the wireless device 16 or to increase the HARQ capability of the wireless device 16 in some way. If the wireless node determines to adjust the HARQ configuration for the wireless device 16, the wireless node adjusts the HARQ configuration for the wireless device (block 904).

The wireless node also determines if a TTI bundling configuration for the wireless device 16 should be adjusted (step 906). According to some embodiments of the present disclosure, the number of subframes used for TTI bundling can be adjusted up or down to achieve a desired level of performance. According to some embodiments, the determination in step 906 can be either to increase the amount of TTI bundling capability or to decrease the amount of TTI bundling capability by, e.g., either decreasing or increasing the number of subframes used for TTI bundling. As an example, if the wireless node determines that the TTI bundling capability is not needed to maintain a desired level of performance, the wireless node may decide to disable the TTI bundling capability for the wireless device 16. On the other hand, if the current information indicates that a TTI bundling capability is needed to maintain a desired level of performance, the wireless node may decide not to adjust the TTI bundling configuration of the wireless device 16 or to increase the TTI bundling capability of the wireless device 16 in some way. If the wireless node determines to adjust the TTI bundling configuration for the wireless device 16, the wireless node adjusts the TTI bundling configuration for the wireless device (block 908). Note that while the steps of FIG. 8 (as with all flowcharts described herein) are illustrated as being performed in a particular order, the steps may be performed in any desired order (or even in parallel) unless otherwise stated or required.

Figure 9:
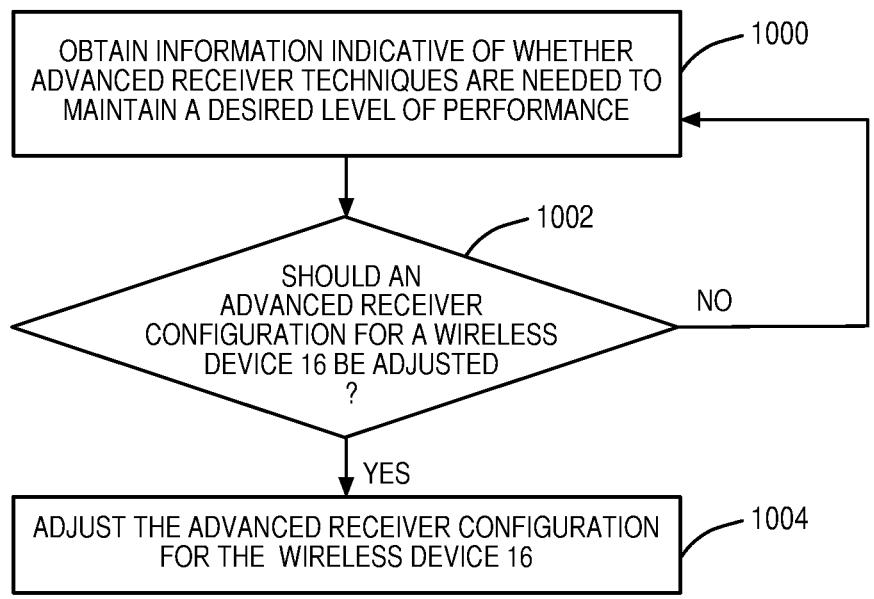
FIG. 9 illustrates a more detailed operation of the wireless node in the cellular communication network as in FIG. 3 for determining if an advanced receiver configuration should be adjusted, according to one embodiment of the present disclosure.
Figure 10:
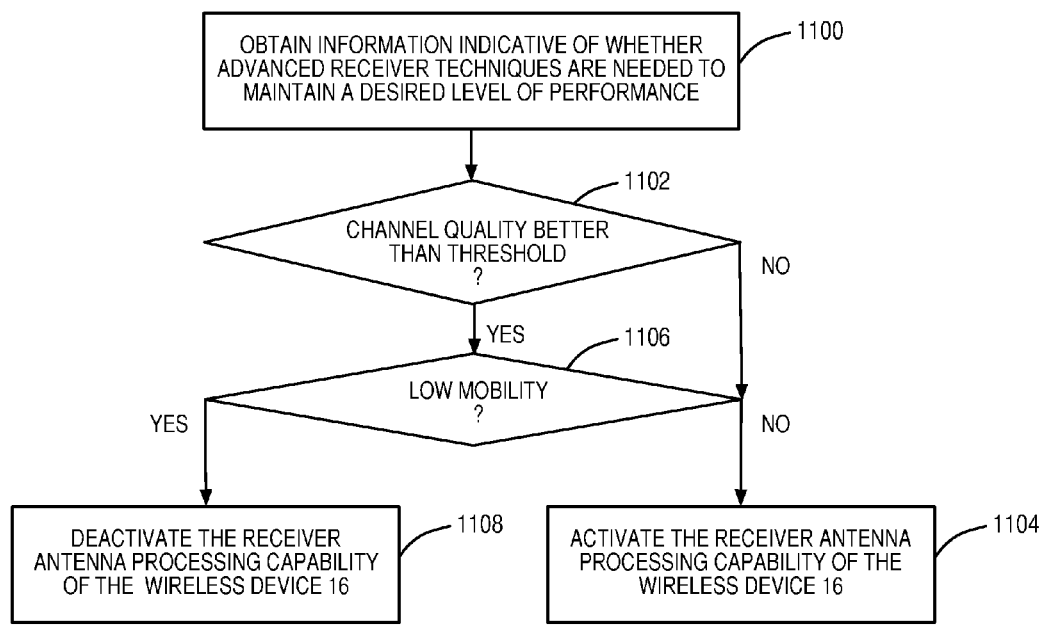
FIG. 10 illustrates a more detailed operation of the wireless node in the cellular communication network as in FIG. 9 for determining if the advanced receiver configuration should be adjusted, according to one embodiment of the present disclosure.
Figure 11:
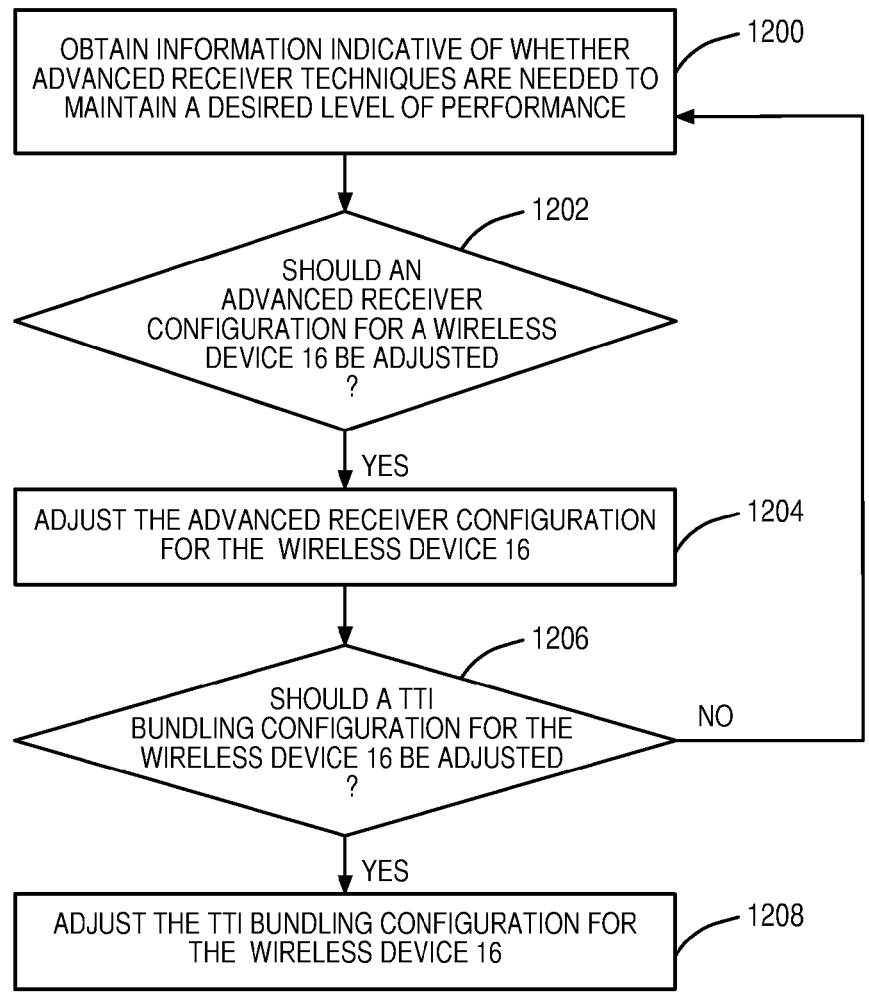
FIG. 11 illustrates the operation of the wireless node in the cellular communication network as in FIG. 9 for determining if the advanced receiver configuration should be adjusted and also determining if a TTI bundling configuration should be adjusted, according to one embodiment of the present disclosure.

FIGS. 6-8 focused on embodiments for determining and controlling a retransmission configuration of a wireless device 16. More specifically, FIGS. 6-8 focused on a HARQ configuration for the wireless device 16. FIGS. 9-11 focus on embodiments for determining and controlling an advanced receiver configuration of the wireless device 16. While these embodiments are shown separately for clarity and ease of description, the embodiments of FIGS. 6-8 may be combined with embodiments from FIGS. 9-11 in any suitable way.

FIG. 9 illustrates the operation of a wireless node in the cellular communication network 10 according to another embodiment of the present disclosure. This embodiment is similar to that of FIG. 3, but where the configuration for the wireless device 16 is an advanced receiver configuration. First, the wireless node obtains information indicative of whether advanced receiver techniques are needed to maintain a desired level of performance for the wireless device (step 1000). This step can be accomplished using, e.g., any of the embodiments described above with respect to FIGS. 3 and 4. The wireless node then determines if an advanced receiver configuration for the wireless device 16 should be adjusted (step 1002).

According to some embodiments, the determination can include deactivating the advanced receiver capability of the wireless device 16 or switching to a different advanced receiver process or technique. By deactivating the advanced receiver capability of the wireless device 16, the wireless device 16 needs less memory capacity and less processor capacity to process the separate received signals. This also reduces the amount of energy used by the wireless device 16, but may also increase the latency of the communications to or from the wireless device 16, as more transmission errors may occur which an advanced receiver capability may have been able to correctly decode. Similarly, switching the wireless device 16 to a different advanced receiver process may save energy by requiring less processing, but may result in a noisier received signal. If the wireless node determines to adjust the advanced receiver configuration for the wireless device 16, the wireless node adjusts the advanced receiver configuration for the wireless device 16 (block 1004).

FIG. 10 illustrates a more detailed operation of the wireless node in the cellular communication network 10 as in FIG. 9 for determining if the advanced receiver configuration should be adjusted, according to one embodiment of the present disclosure. First, the wireless node obtains information indicative of whether advanced receiver techniques are needed to maintain a desired level of performance for the wireless device 16 (step 1100). This step can be accomplished using, e.g., any of the embodiments described above with respect to FIGS. 3 and 4. Next, the wireless node checks to determine if the channel quality for the wireless device 16 is better than a predetermined threshold (step 1102). The channel quality may be the channel quality for communications from the wireless device 16, the channel quality for communications to the wireless device 16, or a combination thereof.

If the channel quality is not better than the predetermined threshold, the wireless node activates the receiver antenna processing capability of the wireless device 16 (step 1104). If the channel quality is better than a predetermined threshold, energy savings may still be achieved. Therefore, the wireless node determines if the wireless device 16 has low mobility (step 1106). As discussed previously, this determination of the mobility of the wireless device 16 can be made based on information received from the wireless device 16 or detected by the base station 12 or other network node based on Doppler frequency offset of the wireless device 16. If the wireless device 16 does not have low mobility, the wireless node activates the receiver antenna processing capability of the wireless device 16 (step 1104). If the wireless device 16 does have low mobility, the wireless node deactivates the receiver antenna processing capability of the wireless device 16 (step 1108).

FIG. 11 illustrates the operation of the wireless node in the cellular communication network 10 as in FIG. 9 for determining if the advanced receiver configuration should be adjusted and also determining if a TTI bundling configuration should be adjusted, according to one embodiment of the present disclosure. First, the wireless node obtains information indicative of whether advanced receiver techniques are needed to maintain a desired level of performance for the wireless device 16 (step 1200). This step can be accomplished using, e.g., any of the embodiments described above with respect to FIGS. 3 and 4. The wireless node then determines if an advanced receiver configuration for the wireless device 16 should be adjusted (step 1202). According to some embodiments, the determination can include deactivating the advanced receiver capability of the wireless device 16 or switching to a different advanced receiver process, as discussed above. If the wireless node determines to adjust the advanced receiver configuration for the wireless device 16, the wireless node adjusts the advanced receiver configuration for the wireless device (block 1204).

The wireless node also determines if a TTI bundling configuration for the wireless device 16 should be adjusted, as discussed above with respect to FIG. 8 (step 1206). If the wireless node determines to adjust the TTI bundling configuration for the wireless device 16, the wireless node adjusts the TTI bundling configuration for the wireless device 16 (block 1208). Note that while the steps of FIG. 11 (as with all flowcharts described herein) are illustrated as being performed in a particular order, the steps may be performed in any desired order (or even in parallel) unless otherwise stated or required.

Up until this point, the focus has been on configuring the wireless devices 16 that are operating under certain conditions such that operating costs can be reduced. The methods disclosed relate to changing the configuration for capabilities already available to the wireless device 16 in order to reduce the cost of operation of the wireless device 16 in terms of, e.g., power and/or radio resource efficiency. Similar methods can be employed at the manufacturing stage. If enough information is known about the wireless device usage characteristics, then decisions can be made about what wireless device characteristics should be included in the wireless device 16 at the manufacturing stage.

Figure 12:
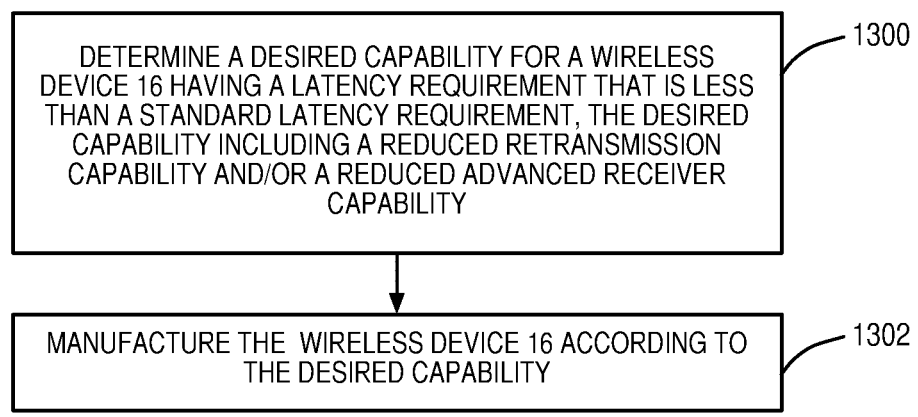
FIG. 12 illustrates the process of manufacturing a wireless device according to a desired capability.

In this manner, FIG. 12 illustrates the process of manufacturing a wireless device 16 according to a desired capability. First, a desired capability for a wireless device (which in this example is one of the wireless devices 16) having a reduced latency requirement is determined, where the desired capability includes a reduced retransmission capability and/or a reduced advanced receiver capability (step 1300). The reduced latency requirement is a latency requirement that is less than a standard latency requirement (e.g., a latency requirement required by a corresponding cellular communications standard for non-MTC wireless devices). Once the desired capability has been determined, the wireless device 16 is manufactured according to the desired capability (step 1302).

Many traffic types for communications to or from the wireless devices 16 have a latency requirement that is a fraction of a second. For instance, a total RTT of data packets in a Voice over IP (VoIP) conversation of more than 250 ms (one fourth of a second) will be noticed by users as a reduction in the quality of the conversation. In contrast, many traffic types for communications from MTC devices have a reduced latency requirement. For example, many MTC devices for monitoring remote sensors can have a latency requirement of seconds or longer. Many smart meters used to monitor utility usage, such as electricity or water usage, have latency requirements of up to hours. As such, using the process of FIG. 12, wireless devices 16 having such reduced latency requirements can be manufactured according to the reduced latency requirements to thereby reduce the cost of manufacturing those wireless devices 16.

Figure 13:
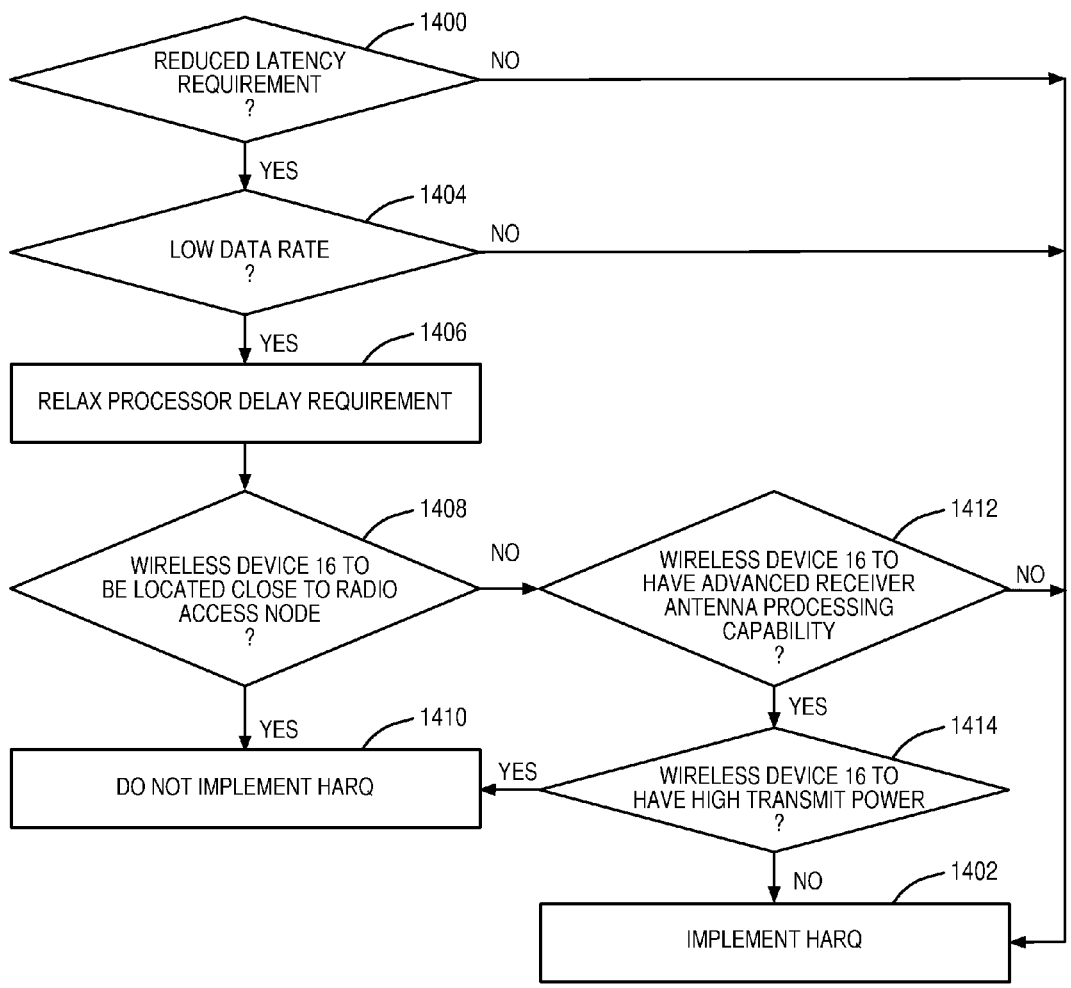
FIG. 13 illustrates a more detailed process of manufacturing a wireless device according to a desired capability as in FIG. 12 for determining a HARQ configuration for the wireless device, according to one embodiment of the present disclosure.

FIG. 13 illustrates a more detailed process of manufacturing a wireless device 16 to either implement or not implement HARQ according to a desired capability of the wireless device 16 according to one embodiment of the present disclosure. First, a determination is made as to whether the wireless device 16 is to have a reduced latency requirement (step 1400). More specifically, in one embodiment, a determination is made as to whether traffic types for communications to or from the wireless device 16 to be manufactured have a latency requirement that is less than a standard latency requirement. If not, then the wireless device 16 is manufactured to implement a HARQ capability (step 1402).

If the wireless device 16 does have a reduced latency requirement, a determination is made as to whether the wireless device 16 is to have a low data rate (step 1404). More specifically, in one embodiment, the traffic types for communications to or from the wireless device 16 to be manufactured are analyzed to determine if a low data rate is expected. As before with the latency requirement, if a low data rate is not expected for the traffic types for communications to or from the wireless device 16 to be manufactured, then the wireless device 16 is manufactured to have a HARQ capability (step 1402).

If a low data rate is expected for the traffic types for communications to or from the wireless device 16 to be manufactured, a processor delay requirement for the wireless device 16 can be relaxed (step 1406). This relaxed processor delay requirement may allow for the inclusion of less processor capacity for the wireless device 16. This determination will save expenses in the manufacturing of the wireless device 16 by allowing the use of a slower and less costly processor. This determination may also save expenses during operation by reducing the energy consumption of the wireless device 16. This relaxed processor delay requirement may require corresponding relaxations in the HARQ capability of the wireless device 16 through a reduced HARQ configuration. The reduced HARQ configuration could include implementing a HARQ capability having an increased RTT for HARQ operation. The HARQ RTT parameter specifies the minimum amount of TTIs before a downlink HARQ retransmission is expected by the wireless device 16. By increasing the HARQ RTT, the wireless device 16 will have more time to process the data received, reducing the processor capacity needed to perform the reduced HARQ capability. Furthermore, the reduced HARQ configuration could include a HARQ capability having a decreased number of processes for HARQ operation. For each of the processes for HARQ operation, the wireless device 16 must maintain a storage buffer to store the PDUs received in the downlink and to store the PDUs to be transmitted in the uplink.

Returning now to the process illustrated by FIG. 13, after determining that the processor delay requirement for the wireless device 16 can be relaxed in step 1406, a determination is made as to whether the wireless device 16 is to be located close to a radio access network node (step 1408). This may be true if the wireless device 16 is, for example, an MTC device (or another device that is static or has low mobility) that is positioned close to the base station 12. Here, "close" to a radio access network node means within a predefined radio distance from the serving radio access network node. The radio distance from the wireless device 16 to a radio access network node can be reflected in terms of, e.g., channel quality. This can be determined, for example, by the RSRP or the CQI reported by the wireless device 16, or by the SINR measured at the network node. For illustrative purposes, the wireless device 16-1 in FIG. 1 has a much smaller radio distance to the base station 12 than the wireless device 16-2, which is very near to the edge of the serving cell 14.

If the wireless device 16 is to be located close to a radio access network node, the wireless device 16 is manufactured to not implement HARQ (step 1410). By determining not to implement a HARQ capability for the wireless device 16, the wireless device 16 can be manufactured with, e.g., less processor capacity and perhaps less memory capacity. This determination will save expense in the manufacturing of the wireless device 16 by allowing the use of a slower and less costly processor and perhaps less memory. This determination may also save expenses during operation by reducing the energy consumption of the wireless device 16.

If the wireless device 16 is not to be located close to a radio access network node, a determination is made as to whether the wireless device 16 is to have advanced receiver antenna processing capability (step 1412). If not, the wireless device is manufactured to implement HARQ (step 1402). Otherwise, a determination is made as to whether the wireless device 16 will have a relatively high transmit power (step 1414). If so, the wireless device 16 is manufactured to not implement HARQ (step 1410). Otherwise, the wireless device 16 is manufactured to implement HARQ (step 1402).

Figure 14:
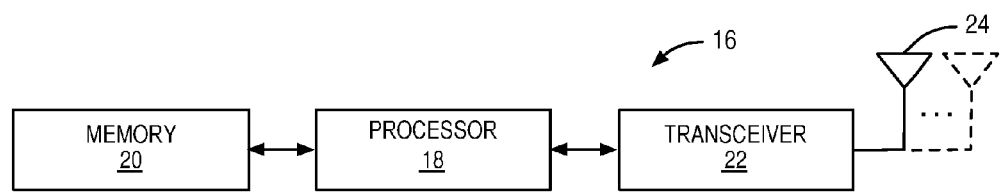
FIG. 14 is a block diagram of the wireless device of FIG. 1 according to one embodiment of the present disclosure.

FIG. 14 is a block diagram of one of the wireless devices 16 of FIG. 1 according to one embodiment of the present disclosure. As shown in FIG. 14, the example wireless device 16 includes a processor 18, a memory 20, a transceiver 22, and one or more antennas 24. In particular embodiments, some or all of the functionality described above as being provided by the wireless device 16 may be provided by the processor 18 executing instructions stored on a computer-readable medium, such as the memory 20 shown in FIG. 14. Alternative embodiments of the wireless device 16 may include additional components beyond those shown in FIG. 14 that may be responsible for providing certain aspects of the device's functionality, including any of the functionality described above and/or any functionality necessary to support the embodiments described above.

Figure 15:
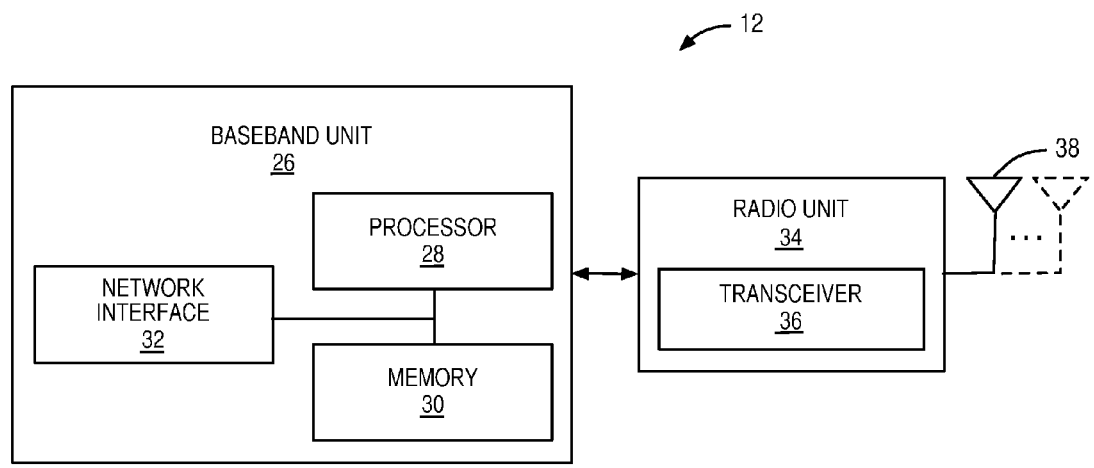
FIG. 15 is a block diagram of the base station of FIG. 1 according to one embodiment of the present disclosure.

FIG. 15 is a block diagram of the base station 12 of FIG. 1 according to one embodiment of the present disclosure. As shown in FIG. 15, the example base station 12 includes a baseband unit 26 including a processor 28, a memory 30, and a network interface 32; and a radio unit 34 including a transceiver 36 connected to one or more antennas 38. In particular embodiments, some or all of the functionality described above as being provided by the base station 12 (e.g., a pico base station, a femto base station, a micro base station, a relay, a remote radio head, an access point, and/or any other type of radio access network node) may be provided by the processor 28 executing instructions stored on a computer-readable medium, such as the memory 30 shown in FIG. 15. Alternative embodiments of the base station 12 may include additional components responsible for providing additional functionality, including any of the functionality identified above and/or any functionality necessary to support the embodiments described above.

The following acronyms are used throughout this disclosure.

3GPP 3$^{rd}$ Generation Partnership Project
ACK acknowledgement
CQI Channel-Quality Indicator
CRC cyclic redundancy check
HARQ Hybrid Automatic Repeat Request
IRC Interference Rejection Combining
LTE Long Term Evolution
M2M Machine-to-Machine
MAC media access control
MRC Maximum Ratio Combining
MTC Machine-Type Communication
NACK negative acknowledgement
PDU Protocol Data Unit
RRC Radio Resource Control
RSRP Reference Signal Received Power
RTT Round-Trip-Time
SINR Signal-to-Interference-and-Noise Ratio
TTI Transmission Time Interval
UE user equipment
VoIP Voice over IP Those skilled in the art will recognize improvements and modifications to the preferred embodiments of the present disclosure. All such improvements and modifications are considered within the scope of the concepts disclosed herein and the claims that follow.

What is claimed is:

1. A method of operation of a wireless node in a cellular communication network, comprising:
    obtaining information indicative of whether retransmission techniques are needed to maintain a desired level of performance for a wireless device; and
    in response to determining that a channel quality for communications to or from the wireless device is better than a predetermined threshold and determining that the wireless device has a low mobility:
        determining a retransmission configuration for the wireless device comprising determining to deactivate HARQ operation for the wireless device; and
        configuring the wireless device according to the configuration.

2. The method of claim 1 wherein the desired level of performance comprises a reduced level of performance for a machine-type communication device that is lower than a level of performance for a non-machine-type communication device.

3. The method of claim 1 wherein the information comprises information indicative of one or more characteristics of the wireless device.

4. The method of claim 3 wherein the one or more characteristics of the wireless device comprise at least one of the group consisting of: an amount of memory of the wireless device, a processor capacity of the wireless device, a number of antennas of the wireless device, a capability of the wireless device to perform one or more advanced receiver techniques, and a maximum transmit power of the wireless device.

5. The method of claim 1 wherein the information comprises information that is indicative of wireless device usage characteristics.

6. The method of claim 5 wherein the wireless device usage characteristics comprise at least one of the group consisting of: a mobility of the wireless device, a latency tolerance of a traffic type for communications from/to the wireless device, a data rate of the wireless device, a radio distance of the wireless device to a network node, and an energy profile of the wireless device.

7. The method of claim 1 wherein the wireless node is a network node of the cellular communication network, and determining the retransmission configuration for the wireless device further comprises determining the retransmission configuration for the wireless device by the network node.

8. The method of claim 7 wherein configuring the wireless device according to the configuration comprises configuring the wireless device via Radio Resource Control signaling from the network node.

9. The method of claim 1 wherein the wireless node is the wireless device, and determining the retransmission configuration for the wireless device comprises determining the retransmission configuration for the wireless device by the wireless device.

10. The method of claim 1 wherein determining the retransmission configuration for the wireless device further comprises determining whether to increase a round-trip-time for HARQ operation for the wireless device.

11. The method of claim 1 wherein determining the retransmission configuration for the wireless device further comprises determining whether to decrease a number of processes for HARQ operation for the wireless device.

12. A network node, comprising:
  a transceiver configured to communicatively couple the network node to a wireless device; and
  a processor associated with the transceiver and configured to:
    obtain information indicative of whether retransmission techniques are needed to maintain a desired level of performance for the wireless device; and
    in response to determining that a channel quality for communications to or from the wireless device is better than a predetermined threshold and determining that the wireless device has a low mobility:
      determine a retransmission configuration for the wireless device comprising determining to deactivate HARQ operation for the wireless device; and
      configure the wireless device according to the configuration.

* * * * *